March 8, 1927.

H. D. MORTON

ARC WELDING SYSTEM

Original Filed Dec. 2, 1918

1,620,219

Harry D. Morton
INVENTOR.

BY

Gifford + Bull
ATTORNEYS

Patented Mar. 8, 1927.

1,620,219

UNITED STATES PATENT OFFICE.

HARRY D. MORTON, OF NEW YORK, N. Y., ASSIGNOR TO AUTOMATIC ARC-WELDING COMPANY, OF DETROIT, MICHIGAN, A CORPORATION OF MICHIGAN.

ARC-WELDING SYSTEM.

Original application filed December 2, 1918, Serial No. 264,930. Divided and this application filed December 24, 1920. Serial No. 432,951.

My invention relates to electric arc welding, and more particularly to automatic and semi-automatic apparatus for this purpose.

The present application is a division of my prior application Serial Number 264,930, which was filed in the Patent Office on or about December 2, 1918.

Figure 1:
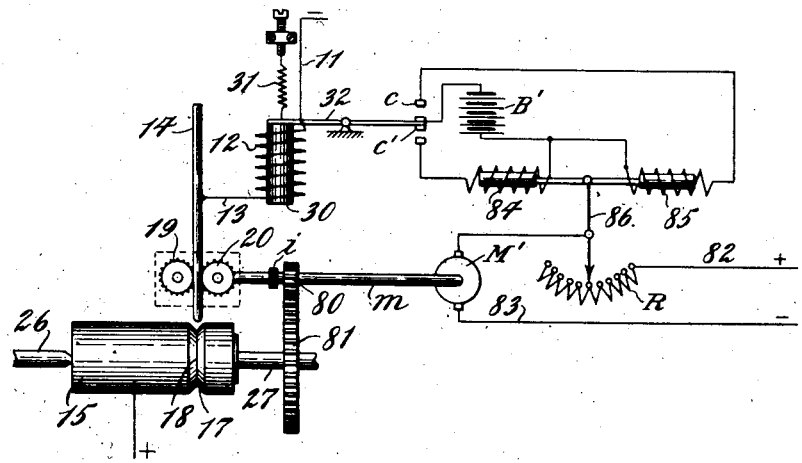
Figure 2:
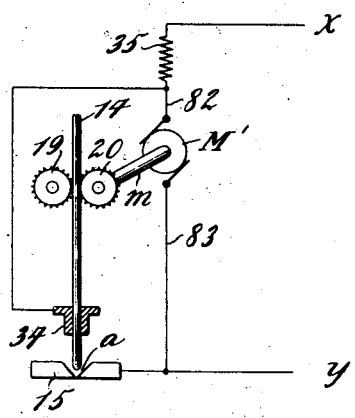

In the drawings, Fig. 1 is a diagrammatic view showing one form of my invention, and Fig. 2 is a diagrammatic view illustrating another form of my invention.

Referring to Fig. 1, current is supplied to the welding circuit from a generator or other suitable source of current, not shown, the circuit including the wire 11, solenoid 12, wire 13, welding strip 14, work 15, and return wire 16. It will be understood that in the welding operation an arc is formed at $a$ between the end of the welding strip and the groove 17 in the work 15. For the purpose of welding two plates or parts together, the ends to be joined are tapered and placed in abutting relation, thereby forming the groove 17; and the intense heat of the arc at $a$ rapidly melts the metallic strip 14 and this molten metal is deposited in the groove 17, thereby uniting the pieces of metal at the joint 18. On account of the fact that the intense heat at the arc $a$ melts the strip 14 rapidly, it is necessary to feed this strip from a reel to the arc uninterruptedly and automatically to produce a homogeneous weld.

The feeding mechanism for feeding the metallic welding strip 14 to the work 15 consists of two feed rollers 19 and 20, preferably provided with serrated perimeters located to receive between them the welding strip 14, which is in the form of a wire. The feed rolls 19 and 20 are rotatably mounted in a welding head 21, which is indicated in dotted lines, and provided with suitable guides for the welding strip 14. The work 15 in the present case consists of two cylindrical members which are to be joined by an annular weld, and in order to do this work is rotated while the welding strip 14 is being fed to the arc at $a$ and while the molten metal formed is being deposited in the groove 17. The cylindrical members constituting the work 15 are rotatably supported in any suitable manner, as by the center 26 and a mandrel 27. The mandrel 27 is connected by the gear 81 to a gear 80 keyed to the motor shaft $m$. It will be seen that by this arrangement the motor shaft $m$ drives the feed rolls 19 and 20 and also produces a relative movement between the work and the welding head while the strip 14 is being fed to the work and the molten metal is being deposited on the work. It will also be noted that the feed rolls are driven at a higher speed than the work, since the ratio of the gears 80 and 81 is about as 1 to 7. A fixed relation is preserved between the feed of the welding strip 14 and the rate of movement of the work 15, but the feed of the welding strip 14 is varied because the welding strip cannot be made uniform throughout its entire length. Different portions of the welding strip may vary in fusibility or be of slightly differing diameters and the strip will, therefore, fuse at different rates. When the welding strip 14 fuses very rapidly, there is a danger that the arc at $a$ may suddenly become so long as to rupture, and then in order to start the arc it is necessary to bring the end of the strip 14 again into contact with the work. Conversely, if the feed of the strip 14 to the arc $a$ is more rapid than the fusion of the welding strip, the welding strip may be fed against the work and cause a short circuit, which is injurious to the work and also requires separating the electrodes to again form an arc.

I have found that under normal conditions an equilibrium is maintained by the arc itself, which has, within certain limits, if the welding strip is continuously fed at a suitable constant rate, a compensatory action, as follows: When the arc shortens the resistance decreases, the amperage rises, and this rise in amperage results in the welding strip fusing more rapidly, thereby causing the arc to lengthen. Conversely, if the arc lengthens the resistance is increased, the amperage decreases proportionately, the welding strip is fused more slowly, and the continuously moving welding strip restores the arc to its normal length. However, in order to take care of the extreme differences of fusibility of the welding strip 14 and thereby maintain the arc, I have devised an automatic control mechanism which is responsive to the changes in the energy at the arc $a$ and which will alter the rate of feed of the welding strip 14 to correct the variations of the arc and thus compensate for the differences in fusibility of the feeding strip. As appears from the description of my device, its effect is to accentuate the self-compensatory action of the arc. In the device here shown, the motor M', which is supplied with current from a source independent of the welding circuit, drives through the shaft $m$ the welding strip feed roll 20 and through gears 80, 81, the mandrel 27 supporting the work 15. In series with the armature of this motor M' is the rheostat R. The arm 86 of this rheostat is connected to the armatures of the coils 84, 85. These coils 84, 85 receive their current from an independent source, such as the battery B'. In this local circuit are the two switches $c$, $c'$. These switches are operated by the movable switch member 32 attached to the armature 30 of the control solenoid 12 in series with the arc. The operation of the device is as follows: The arc is struck by first moving the welding strip 14 into contact with the work 15 and then separating the same therefrom manually, or in any other well known manner. Thereafter the welding strip is continuously fed toward the work during the welding process. In the event of the arc becoming too short, the solenoid 12 becomes more strongly energized and its armature 30 overcomes the tension of the opposing spring 31, causing the movable switch member 32 to engage with the stationary contact member $c$, thereby establishing a local circuit from the battery B' through the solenoid 85 and moving the rheostat arm 86 in a direction to cut in additional resistance in the resistance member R. The amount of current in the armature of the motor M' is thereby reduced and the speed of the motor correspondingly decreased. This reduction in the rate of feed in the welding strip 14 results in the welding strip being fused more rapidly than it is fed and the arc is quickly restored to its normal length. Conversely, if, during the welding process, the arc becomes unduly long, the pull of solenoid 12 is correspondingy decreased and the tension of the opposing spring 31 overcomes the solenoid pull, causing the movable switch member 32 to engage the stationary contact $c'$ and thereby close the local circuit from the battery B' through the solenoid 84 and move the rheostat arm 86 in a direction to cut out some of the resistance in the rheostat R. The amount of current in the armature of the motor M' is thereby increased, the speed of the motor is correspondingly accelerated, thus causing the welding strip 14 to be fed more rapidly than it is fused, and restoring the arc to its normal length.

In Fig. 2, $x$ and $y$ are the two terminals of the source, 15 is the work and 14 the welding strip. The welding strip 14 is shown diagrammatically as fed forward by wheels 19 and 20, one of which is rotated by an electric motor M' whose armature is in shunt to the arc and whose field winding 35 is in series therewith.

It will be observed that the welding strip in the device herein shown, for purposes of illustration, is carried by a suitable guide 34 and feeding rolls 19 and 20. The current is carried to the electrode chiefly by the lower guide or holder 34. I have found that it is very desirable for the maintenance of a stable arc, and in commercial use practically indispensable for the best results, that the electrode holder of an arc welding machine having automatic electrode feeding and arc maintaining means, should be as close as possible to the arc. The reason for this is not entirely clear, but I have found from much experience that if the electrode holder is a considerable distance from the arc, the arc becomes unstable and difficult to control. For example, in a particular automatic machine, developed and built by me, I have found that with a current of 140 amperes an electrode of iron or steel wire $\frac{3}{32}$ inch in diameter, fed at a speed of about 16 inches a minute through a holder, such as 3, reaching to within $\frac{1}{2}$ to $\frac{5}{8}$ inch of the arc, the operation is stable as long as the machine is kept in operation. If, however, this distance is materially increased in said machine, the length of time that the arc continues stable decreases, and if the distance is as great as 2 or $2\frac{1}{2}$ inches the arc is stable only for a few seconds after the machine is started.

It may be that this effect is purely mechanical and the result of vibration resulting from the feeding forward of the electrode strip. I have observed that this condition of instability accompanies the extension backward from the arc of the incandescence of the electrode and that the correct distance is to be determined in view of the diameter of the wire, the current carried, and the speed at which the wire is fed. This leads me to believe that the sudden increase of resistance of the wire as it reaches the temperature of recalescence, and the extension backward of such a temperature to too great a distance, is the cause of this instability. However this may be, the fact is unquestionably established by my experience, and I have discovered that the difficulty can be overcome by supporting and conveying the current to the electrode at a point close to the arc, and that unless this lower electrode holder is brought down rather near the arc, continuous stable operation is very difficult to secure.

It is advantageous to have this electrode guide of sufficient current carrying capacity to avoid its being greatly heated by the current which it carries, and of good heat conducting material. A wire or rod $\frac{1}{16}$ of an inch in diameter would be melted in a short time by a current of about 90 amperes, and one of $\frac{1}{8}$ diameter by a current of about 140 amperes, and, in general, the current employed in welding is large enough to soon melt or raise to high incandescence the electrode used if the latter were stationary. Inasmuch as the wire is fed continuously forward, it does not melt except at the arc, even with continuous welding, and by taking the current to the electrode near to the arc the heating to incandescence, with its attendant extreme changes in resistance, is confined to a short length of the electrode. The changes of resistance are, therefore, a small percentage of the total resistance and do not result in instability. It will be seen, therefore, that the continuous feed and the point of support at which the current is taken to the electrode are features intimately related to the stability of the arc.

The lower electrode holder is preferably made adjustable to and from the work in any well known or convenient manner, in order that the most advantageous distance from the arc may be attained for any particular circumstances of use.

While I have shown means for steadily feeding the electrode toward the work, and prefer such means, I do not limit myself thereto, as the intermittent feeding of the electrode by short increments at frequent intervals may be substituted for the steady feed, and by the expression "continuously feeding" as used in my claims, I intend to include either a steady feed or an intermittent feed sufficiently rapid to be equivalent thereto.

What I claim and desire to secure by Letters Patent of the United States is:

1. In a metallic electrode arc welding apparatus, a welding tool having automatic means for continuously feeding the electrode toward the work, adjustable means for maintaining the arc, and means for conveying current to the electrode at a point close to and at a fixed distance from the arc.

2. The improvement in that process of electric arc welding wherein the arc is formed between the work and a metallic welding strip furnishing metal to the weld, which consists in supplying the current to the welding strip at a point close to and at a fixed distance from the arc.

3. The improvement in that process of electric arc welding wherein the arc is formed between the work and a metallic welding strip continuously fed toward the work, which consists in supplying the current to the welding strip at a point close to and at a fixed distance from the arc.

4. In an electric arc welding apparatus, means for conveying current to the welding strip at a point close to and at a fixed distance from the arc.

5. In an electric arc welding apparatus, means for supporting and feeding a welding strip, and means for conveying current to the strip at a point close to and at a fixed distance from the arc.

6. In a metallic electrode arc welding apparatus, means for continuously feeding a welding strip toward the work, and means for supporting and supplying current to said strip at a point close to and at a fixed distance from the arc.

7. In a metallic electrode arc welding apparatus, a welding tool having automatic means for feeding the electrode toward the work, adjustable means for maintaining the arc, and means for conveying current to the electrode at a point close to and at a fixed distance from the arc.

HARRY D. MORTON.